(12) United States Patent
Naveh

(10) Patent No.: US 8,739,026 B2
(45) Date of Patent: May 27, 2014

(54) MARKUP LANGUAGE SCHEMA ERROR CORRECTION

(75) Inventor: Yaron Naveh, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 13/279,283

(22) Filed: Oct. 23, 2011

(65) Prior Publication Data

US 2013/0061133 A1 Mar. 7, 2013

Related U.S. Application Data

(60) Provisional application No. 61/531,500, filed on Sep. 6, 2011.

(51) Int. Cl.
*G06F 17/00* (2006.01)
*G06F 9/45* (2006.01)

(52) U.S. Cl.
USPC .......... 715/237; 715/234; 715/255; 715/760; 717/143; 717/150

(58) Field of Classification Search
USPC ......... 715/200, 202, 205, 226, 234, 237, 250, 715/255, 256, 273, 700, 760
See application file for complete search history.

(56) References Cited

U.S. PATENT DOCUMENTS

| 7,165,239 | B2 * | 1/2007 | Hejlsberg et al. | 717/114 |
|---|---|---|---|---|
| 7,373,595 | B2 | 5/2008 | Jones et al. | |
| 7,487,515 | B1 | 2/2009 | Jones et al. | |
| 7,657,832 | B1 * | 2/2010 | Lin | 715/234 |
| 8,321,045 | B2 * | 11/2012 | Weinrich et al. | 700/108 |
| 2002/0120647 | A1 * | 8/2002 | Amano | 707/501.1 |
| 2003/0167446 | A1 * | 9/2003 | Thomas | 715/513 |
| 2004/0194016 | A1 * | 9/2004 | Liggitt | 715/501.1 |
| 2004/0226002 | A1 * | 11/2004 | Larcheveque et al. | 717/126 |
| 2006/0259515 | A1 * | 11/2006 | Weinrich et al. | 707/104.1 |
| 2007/0250766 | A1 * | 10/2007 | Medi et al. | 715/513 |
| 2012/0159306 | A1 * | 6/2012 | Sharma et al. | 715/234 |

FOREIGN PATENT DOCUMENTS

KR 20080052399 A 6/2008

OTHER PUBLICATIONS

C. Siefkes, "A shallow algorithm for correcting nesting errors and other well-formedness violations in XML-like input," Extreme Markup Languages, Aug. 2-6, 2004.
IBM, "Dynamic repair of malformed XML," IP.com Journal, IPCOM000192702D, Jan. 29, 2010.

* cited by examiner

*Primary Examiner* — Maikhanh Nguyen

(57) ABSTRACT

The following is iteratively performed a number of times. Whether the markup language schema has an error is determined. Where the markup language schema has an error, the markup language schema is modified to attempt to correct the error.

11 Claims, 3 Drawing Sheets

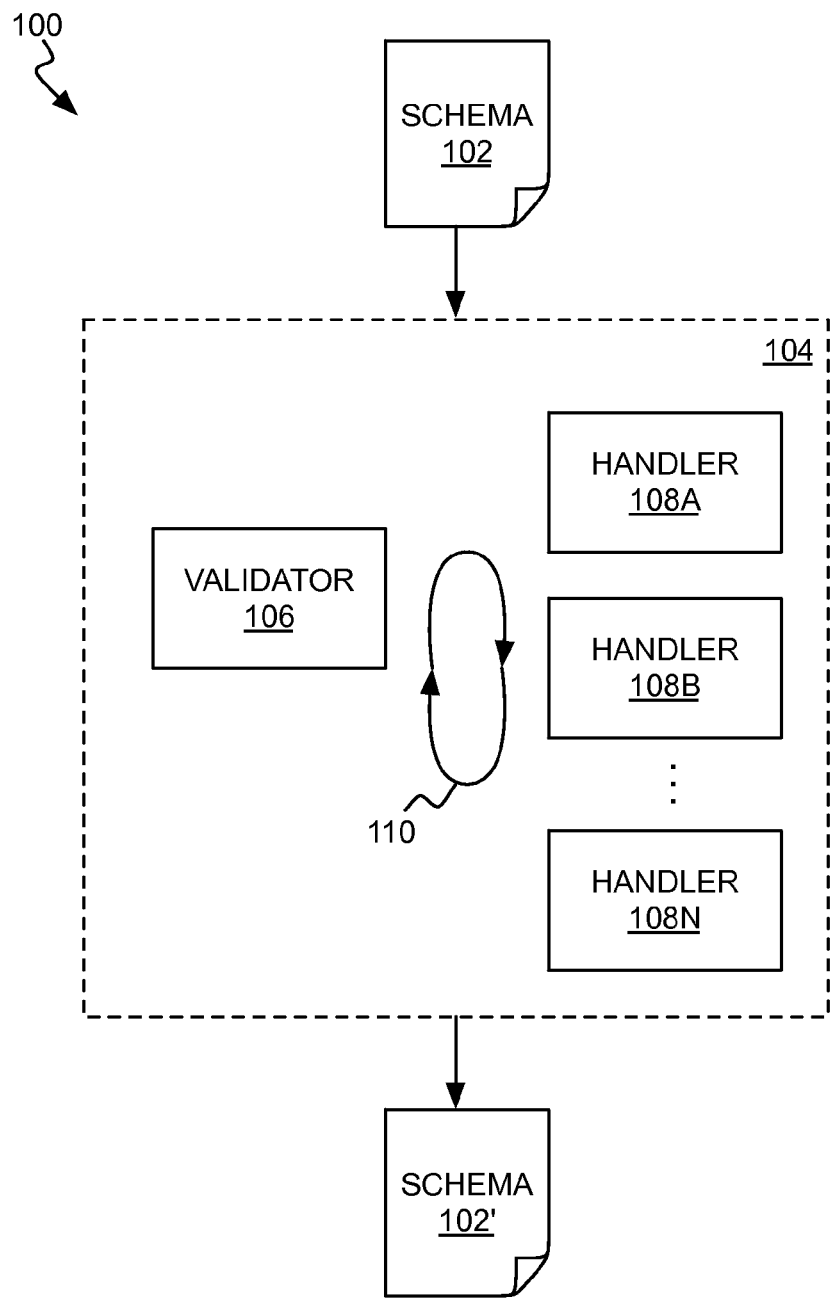

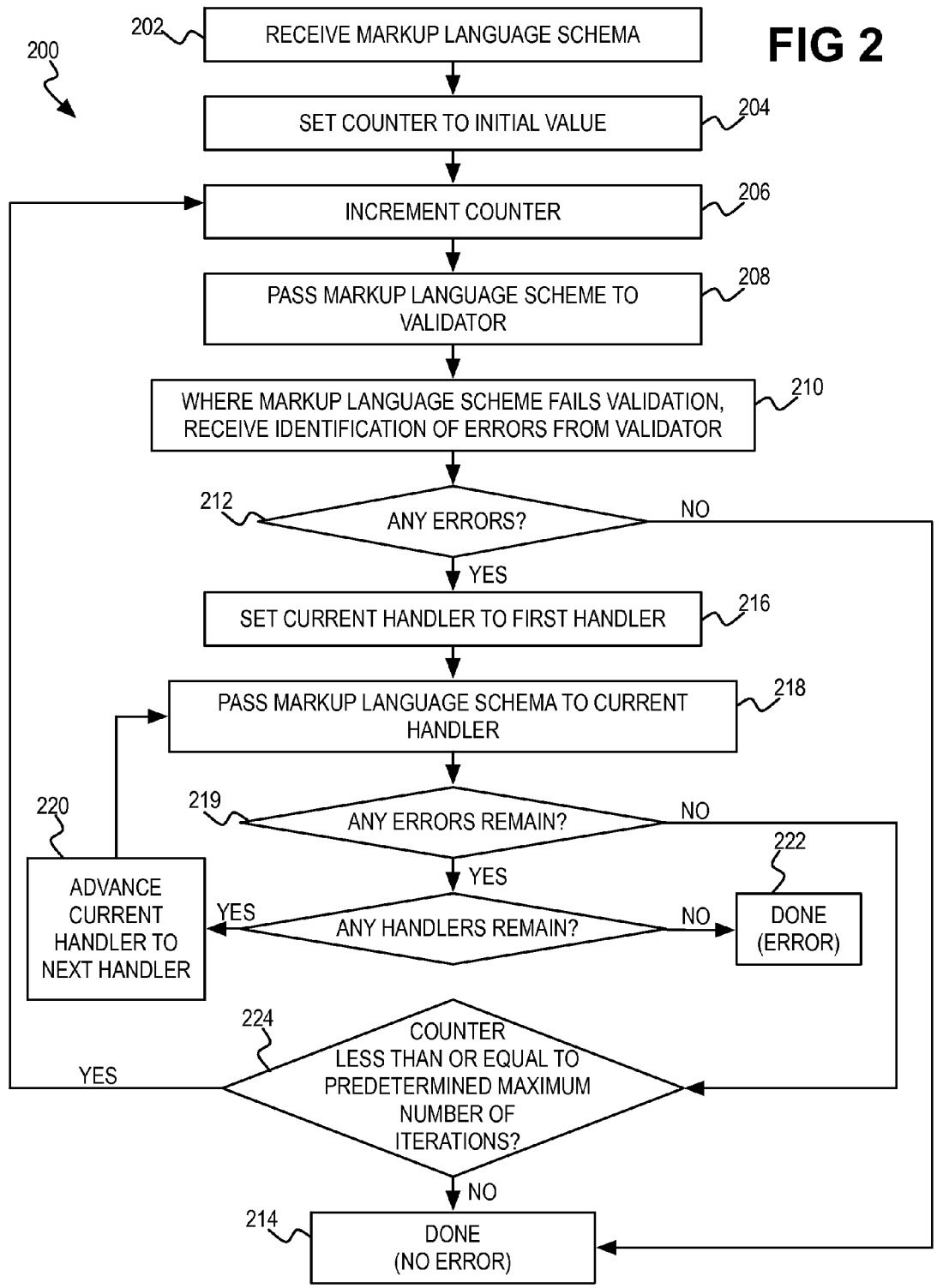

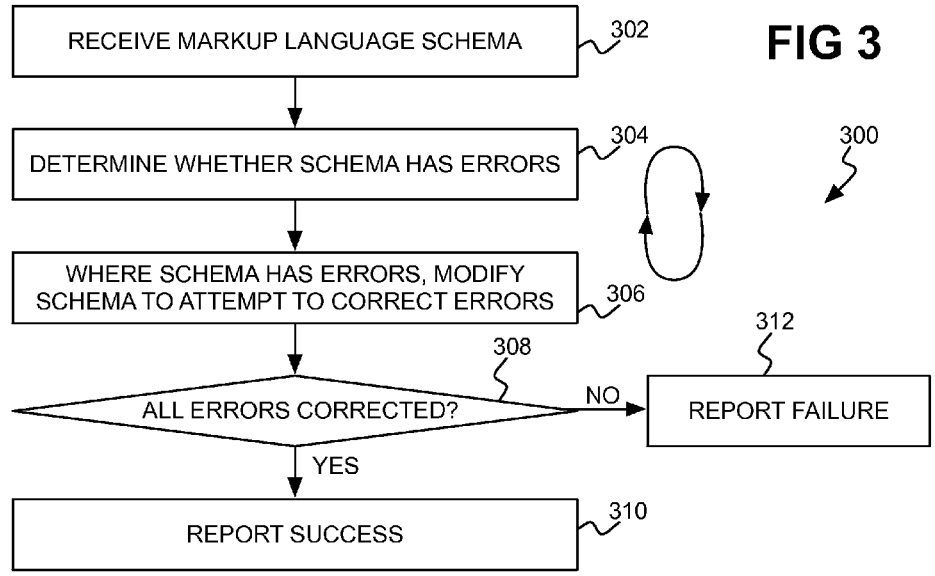
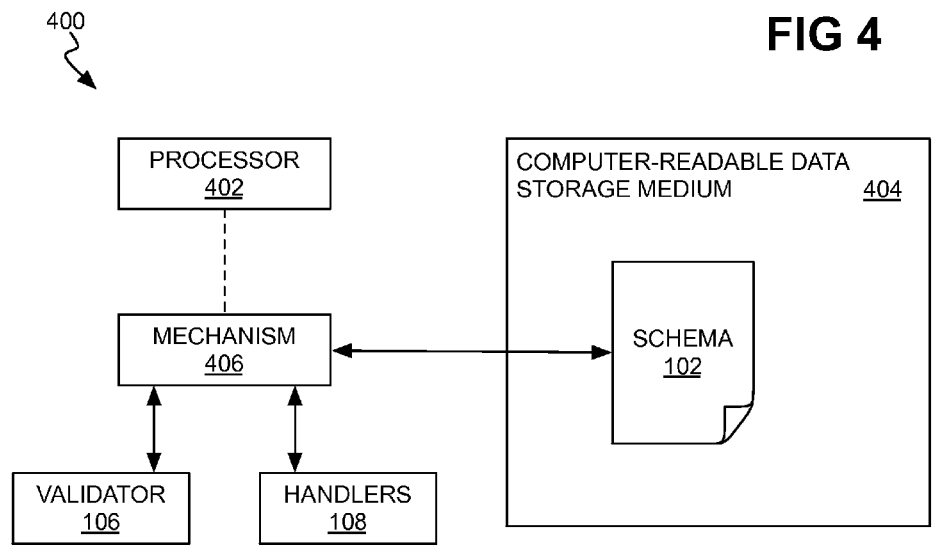

MARKUP LANGUAGE SCHEMA ERROR CORRECTION

RELATED APPLICATIONS

The present patent application claims priority to and the benefit of the previously filed US provisional patent application entitled "auto-correction of malformed XML schemas," filed on Sep. 6, 2011, and assigned application No. 61/531,500.

BACKGROUND

A markup language is mechanism for annotating, or marking up, text in a manner that is syntactically distinguishable from that text. An example of a markup language is the extensible markup language (XML), which codifies a set of rules for encoding documents particularly in a machine-readable form. An XML schema, or XML schema document (XSD), defines the constraints, structure, and content of a corresponding set of XML documents.

XML forms the basis for other languages in which markup language documents can be written, including the web services description language (WSDL), as well as the simple object access protocol (SOAP). The latter is a protocol specification for exchanging structured information over web services using computer networks. A web service is a manner by which two electronic devices can communicate over such networks.

BRIEF DESCRIPTION OF THE DRAWINGS

FIG. 1 is a diagram of an example architecture in which errors within a markup language schema can be iteratively corrected.

FIG. 2 is a flowchart of an example method for iteratively correcting errors within a markup language schema.

FIG. 3 is a flowchart of another example method for iteratively correcting errors within a markup language schema, and is more general than but consistent with the method of FIG. 2.

FIG. 4 is a diagram of an example system for iteratively correcting errors within a markup language schema.

DETAILED DESCRIPTION

As noted in the background section, markup language documents can be defined in accordance with corresponding schemas. For instance, extensible markup language (XML) documents can be defined in accordance with corresponding XML schemas, or XML schema documents (XSDs). XML schemas may themselves be used in the context of other standards, such as those specified by a web services description language (WSDL).

However, various types of problems can occur with such schemas. An XML schema that is a standalone schema or that is used as a part of another standard, such as WSDL, may not adhere to the standards governing XML schemas themselves. A WSDL file should itself also obey the WSDL standard, but may not do so because of errors related to the XML schemas that it embeds. Furthermore, a schema may be technically valid, but some types of schema parsers may not be able to parse the schema, due to an inability of handling what are in fact valid or legal constructs. In these and other situations, it can be said that a given markup language schema has errors.

Disclosed herein are techniques to automatically correct such errors within a markup language schema, without user interaction, or with minimal user interaction. The following process is iterated a number of times. It is determined whether the markup language schema has one or more errors. For instance, the schema may be passed to a validator computer program that is adapted to validate the schema, where the schema is said to have one or more errors if validation fails. If the markup language schema has one or more errors, then it is modified to attempt to correct the errors. For instance, the schema may be passed to one or more handler computer programs that are each adapted to correct errors of a different type.

It has been found that iterating this error detection and error correction process more than one time is beneficial, for at least two reasons. First, some errors may be undetectable until other errors have been corrected. Second, correcting some errors may introduce new errors into the markup language schema. The markup language schema may be modified as minimally as possible to correct a given error. For instance, it has been found that minor semantic changes in a markup language schema can be sufficient to correct some types of errors, without necessitating large and widespread changes throughout the schema.

FIG. 1 shows an example architecture 100 in which a markup language schema 102 having one or more errors is processed to result in a corrected markup language schema 102'. The markup language schema 102 is iteratively subjected to processing 104, including that performed by a validator 106, and one or more handlers 108A, 108B, . . . 108N, which are collectively referred to as the handlers 108. The validator 106 and the handlers 108 may each be implemented as a computer program, or a computer program part.

The validator 106 validates the markup language schema 102. If validation is successful, then this means that the markup language schema 102 contains no errors. However, if validation is unsuccessful, then this means that the markup language schema 102 contains one or more errors. The validator 106 may output a list of the errors that the markup language schema 102 contains. It is noted that different validators 106 may be used to ensure that the markup language schema is compatible with a particular implementation to which a given validator 106 corresponds.

If the markup language schema 102 contains one or more errors, then the handlers 104 process the schema 102 to attempt to correct the errors. Each handler 104 may be able to correct errors of a different type, for instance. In one embodiment, the handlers 104 process the markup language schema 102 in successive order. That is, first the handler 108A processes the markup language schema 102, and if errors still remain, then the handler 108B processes the schema 102, and so on.

The last handler 108N may be a brute force handler that is able to correct any errors within the markup language schema 102 that a prior handler 108 cannot correct, but the handler 108N may correct such errors in a less elegant fashion than the prior handlers 108. For instance, the handler 108N may simply remove the offending element from the markup language schema 102, ensuring that the source of the error is removed. In this example, then, it can be guaranteed that the handlers 108 correct any errors that may be present within the markup language schema 102.

However, in another example, there may be errors that the handlers 108 cannot correct. In this scenario, if the markup language schema 102 is subjected to each of the handlers 108 and errors still remain within the schema 102, then processing within the architecture 100 is terminated. A user may be informed, for instance, that the markup language schema 102 has uncorrectable errors.

As noted above, correcting errors within a markup language schema 102 can result in previously undiscoverable errors within the schema 102 becoming discoverable, and/or can result in the introduction or creation of new errors within the schema 102. Therefore, the validation-and-correction processing 104 is iterated more than one time, as indicated by the arrowed loop 110 in FIG. 1. It has been found that iterating a total of two times through the processing 104 is usually sufficient.

The end result of the processing 104 is the corrected markup language schema 102'. The corrected markup language schema 102' does not contain the errors that the uncorrected markup language schema 102 does prior to being subjected to the processing 104. As noted above, it can be desirable for the error correction performed by the handlers 108 to result in as minimal modification to the markup language schema 102 as possible in generating the corrected markup language schema 102'.

Some examples of markup language schema correction are now presented. A markup language schema may contain an element of a type that is unknown. That is, the markup language schema may reference an element without having its type defined. A minimal manner by which to correct such an error is to replace the undefined element definition with a generic definition. This element defines the element type as being any type. For instance, the markup language schema may be modified to include the element <element type="anyType"/>. As such, this advantageously permits the corrected schema to be compatible with any standard schema parser.

As another example, a markup language schema may improperly specify its location via a location tag, instead of a schemaLocation tag. For instance, the markup language schema may specify its location via the element <location=schema.xsd/>, instead of more correctly as <schemaLocation=schema.xsd/>. Therefore, a minimal manner by which to correct this error is to modify the former element so that it reads like the latter element.

A third example is that a markup language schema may introduce a root level element specifying an attribute that is a clear misspelling of an intended element. For instance, one common attribute is minOccurs, which specifies the minimum number of types the element has to appear in a markup language document formatted in accordance with a markup language schema. If this attribute is instead specified as minOccurres, then a minimal manner by which to correct this error is to modify the specified attribute so that it is instead minOccurs.

A fourth example of a malformed schema is one that defines the same type multiple times. This includes the case where the duplication in question appears in a referenced schema. To correct this issue, duplicate definitions can be removed. The handler may also identify a case where multiple definitions are identical, in which case it is safe to remove the definitions except for one. The handler may additionally identify a case where definitions are similar but different, in which case it can choose which definition(s) should be removed, such as by employing appropriate heuristics, or by another approach. The fields of the deleted types may nevertheless be maintained within the kept definition.

The correction of errors within a markup language schema may be performed automatically, without user interaction. However, as desired, or in cases where it is not known with great confidence whether a given element within the markup language schema is erroneous, a user may be permitted an opportunity to review each error and the suggested correction-oriented modification, before the modification is finalized in the schema. In some scenarios, the user can specify that just the suspected errors in which the validator has low confidence that the offending elements are indeed erroneous should be presented to the user for review and acceptance.

The architecture can be modular. So long as a common interface by which validators are to output errors and by which handlers are to input errors is abided, different validators and different handlers can be employed. For instance, if a particular type of error is found to not consistently be corrected by existing handlers, a new handler can be added to correct errors of this type. Similarly, if a particular type of error, while able to be corrected by the handlers, is consistently not detected by the validator, a different handler can instead be used that more consistently detects errors of this type.

FIG. 2 shows an example method 200 that corrects errors within markup language schemas in an iterative manner. A computer program stored on a non-transitory computer-readable data storage medium and executable by a processor of a computing device can implement the method 200. Such a computer program can be said to be a mechanism for correcting errors within markup language schemas in an iterative manner. The processor in this case can be said to implement the mechanism, insofar as the processor executes the computer program to perform the method 200.

The method 200 receives a markup language schema (202). A counter is set to an initial value, such as one (204). The method 200 increments the counter (206), and passes the markup language schema to a validator (208). If the markup language schema fails validation, then the method 200 receives identification of the errors within the schema from the validator (210), such as within a list. If the validation is by comparison successful, then there are no errors within the markup language schema (212), the method 200 finishes without error (214).

However, if the markup language schema has one or more errors (212), then what is referred to as a current handler is set to a first handler of the handlers that are available for correcting errors within the schema (216). The method 200 passes the markup language schema to the current handler for the current handler to attempt to correct the errors within the schema (218). The current handler may correct all, none, or some of the errors within the markup language schema.

If there are still any errors within the markup language schema after the current handler has processed the schema (218), and if not all the handlers have yet processed the schema (219), then the method 200 advances the current handler to the next handler that has not yet processed the schema (220). The method 200 is then repeated at part 218. However, if there are still any errors after the current handler has processed the schema (218), but the current handler is the last handler (219), then the method 200 finishes with error (222). This is because the handlers were unable to correct all the errors within the markup language schema.

Once no errors remain within the markup language schema after the current handler has processed the schema (218), though, if the counter is less than or equal to a predetermined maximum number of iterations (224), then the method 200 is repeated at part 206 to iterate the validation and handling process again. For example, if the initial value of the counter is set to two in part 204, and the predetermined maximum number of iterations is set to three, this means that a total of two validation and handling process iterations are performed in the method 200. If the maximum number of iterations has been reached (224), the method 200 finishes without error (214).

FIG. 3 shows an example method 300 for correcting errors within a markup language schema. The method 300 is more general than but consistent with the example method 200 that has been described. A markup language schema is received (302), such as by a processor.

The processor determines whether the markup language schema has one or more errors (304). For instance, the markup language schema may be passed or transmitted to a validator that validates the schema. Where the markup language schema fails validation, identification of the one or more errors that resulted in the schema failing validation are received from the validator.

Where the markup language schema has one or more errors, therefore, the processor modifies the schema to attempt to correct the errors (306). The markup language schema may be modified as minimally as possible for each error to correct the error, as noted above. Modifying the markup language schema in part 306 can include transmitting or passing the schema to one or more handlers in succession, until all the errors within the schema have been corrected. As such, from each handler to which the markup language schema is passed or transmitted, results are received indicating whether the handler was able to correct any of the errors, and if so, which errors have been corrected. In some implementations, as soon as the errors within the markup language schema have been all corrected, the schema is not passed to any further handlers.

As indicated by the arrowed loop 308 in FIG. 3, parts 304 and 306 are iteratively repeated more than once. This is to ensure that any errors within the markup language schema and that are not detectable until other errors have been corrected are corrected as well. This is also to ensure that any errors that are introduced into or created within the markup language schema as a result of the correction of other errors are corrected, too.

If all the errors within the markup language schema have been corrected (308), then the processor can report that the error correction process has been successful (312), such that the markup language schema is error-free. However, if one or more errors remain within the markup language schema (308), then the processor can report that the error correction process has failed (310). For instance, the processor may identify the errors that were not corrected, such as by highlighting them within the markup language schema, for further review and investigation by a user.

FIG. 4 shows an example system 400 for correcting errors within a markup language schema. The system 400 can be implemented as a computing device, such as a desktop or a laptop computer. The system 400 includes at least a processor 402, a computer-readable data storage medium 404, and a mechanism 406. The system 400 can also include the validator 106 and the handlers 108 that have been described. The system 400 can further include other components, in addition to and/or in lieu of those depicted in FIG. 4.

The computer-readable data storage medium 404 may be or include a non-volatile medium and/or a volatile medium. The computer-readable data storage medium 404 stores the markup language schema 102 that has errors, which are corrected within the system 400. The markup language schema 102 can be an XML schema, an XSD, a markup language schema written in accordance with a WSDL, part of a SOAP stack, and/or part of a stack defining a web service, among other types of schemas.

The mechanism 406 is said to be implemented by the processor 402, in that, for instance, the mechanism 406 may be realized by a computer program that is executable by the processor 402. The computer program may be stored on the computer-readable data storage medium 404, or another computer-readable data storage medium. The mechanism 406 can preform the methods 200 and 300 that have been described, and thus effectuates the processing 104 of FIG. 1.

In this respect, the system 400 can include the validator 106 and the handlers 108 that have been described. The validator 106 and the handlers 108 may also be realized by one or more computer programs that are executable by the processor 402. The mechanism 406 thus retrieves the markup language schema 102 from the computer-readable data storage medium 404, and communicates the schema 102 to the validator 106 and to the handlers 108 as has been described. The mechanism 406 may then overwrite the markup language schema 102 stored on the computer-readable data storage medium 404 with a corrected version thereof, or store the corrected version of the schema 102 in addition to the original version of the schema 102.

I claim:

1. A method comprising:
  receiving, by a processor, a markup language schema;
  iteratively performing a plurality of times:
    determining, by the processor, whether the markup language schema has one or more errors; and,
    where the markup language schema has one or more errors, modifying the markup language schema, by the processor, to attempt to correct the one or more errors,
  wherein determining whether the markup language schema has one or more errors comprises:
    transmitting the markup language schema to a validator that validates the markup language schema; and,
    where the markup language schema fails validation by the validator, receiving identification of the one or more errors from the validator, and
  wherein modifying the markup language schema to attempt to correct the one or more errors comprises:
    transmitting the markup language schema to a handler that is to correct errors within markup language schemas; and,
    receiving results from the handler as to whether the handler was able to correct any of the one or more errors within the markup language schema.

2. The method of claim 1, wherein modifying the markup language schema to attempt to correct the one or more errors comprises:
  setting a current handler to a handler of a plurality of handlers, each handler to correct errors within markup language schemas;
  as an entry point of the method, transmitting the markup language schema to the current handler;
  receiving results from the current handler as to whether the current handler was able to correct any of the one or more errors within the markup language schema; and,
  where at least one of the one or more errors within the markup language schema remain uncorrected, and where the markup language schema has not yet been transmitted to each handler, advancing the current handler to a next handler of the plurality of handlers, and repeating the method at the entry point.

3. The method of claim 2, wherein modifying the markup language schema to attempt to correct the one or more errors further comprises:
  where none of the one or more errors within the markup language schema remain uncorrected, and where the markup language schema has not yet been transmitted to each handler, not advancing the current handler to a next handler of the plurality of handlers, and not repeating the method at the entry point.

4. The method of claim 1, wherein modifying the markup language schema to attempt to correct the one or more errors results in an additional error that was previously undetectable becoming detectable.

5. The method of claim 1, wherein modifying the markup language schema to attempt to correct the one or more errors results in a new error being introduced into the markup language schema.

6. The method of claim 1, further comprising, after modifying the markup language schema to attempt to correct the one or more errors:
  determining whether the one or more errors have been corrected, by the processor, as a result of modifying the markup language schema; and,
  where the one or more errors have not been corrected, reporting that the one or more errors are uncorrectable, by the processor.

7. The method of claim 1, wherein iteratively performing the plurality of times determining whether the markup language schema has one or more errors and where the markup language schema has one or more errors, modifying the markup language schema, comprises:
  setting a counter to an initial value, by the processor;
  as an entry point of the method, incrementing the counter, by the processor; determining, by the processor, whether the markup language schema has one or more errors;
  where the markup language schema has one or more errors, modifying the markup language schema, by the processor, to attempt to correct the one or more errors; and, repeating the method at the entry point if the counter is less than or equal to a predetermined maximum number of iterations.

8. The method of claim 7, wherein iteratively performing the plurality of times determining whether the markup language schema has one or more errors and where the markup language schema has one or more errors, modifying the markup language schema, further comprises:
  where the markup language schema has no errors, ending the method.

9. The method of claim 1, wherein the markup language schema is one or more of:
  an extensible markup language (XML) schema; an XML schema document (XSD);
  a markup language schema written in accordance with a web services description language (WSDL);
  part of a simple object access protocol (SOAP) stack;
  part of a stack defining a web service.

10. A system comprising:
  a processor;
  a computer-readable data storage medium to store a markup language schema; and, a mechanism implemented at least by the processor to iteratively determine whether the markup language schema contains an error and to modify the markup language schema to attempt to correct the error where the markup language schema contains an error;
  a validator to which the mechanism passes the markup language schema to determine whether the markup language schema contains an error, the validator to validate the markup language schema, the markup language schema containing an error where the markup language schema fails validation;
  one or more handlers to which the mechanism passes the markup language schema to correct the error, each handler to correct markup language schema errors of a different type.

11. A non-transitory computer-readable data storage medium storing a computer program executable by a processor to perform a method comprising:
  setting a counter to an initial value;
  as a first entry point of the method, incrementing the counter;
  passing a markup language schema to a validator computer program to determine whether the markup language schema contains one or more errors, the validator computer program to validate the markup language schema;
  where the markup language schema fails validation by the validator computer program,
    receiving identification of the one or more errors from the validator computer program;
    setting a current handler computer program to a handler of a plurality of handler computer programs, each handler computer program to correct errors within markup language schemas;
    as a second entry point of the method, passing the markup language schema to the current handler computer program to attempt to correct the one or more errors;
    where at least one of the one or more errors remain uncorrected, and where the markup language schema has not yet been transmitted to each handler computer program, advancing the current handler computer program to a next handler computer program of the plurality of handler computer programs, and repeating the method at the second entry point; and,
    repeating the method at the first entry point if the counter is less than or equal to a predetermined maximum number of iterations.

* * * * *